United States Patent Office 3,631,181
Patented Dec. 28, 1971

3,631,181
PREPARATION OF NITROALKYLTETRAHYDROFURANS
John M. Larkin, Wappingers Falls, N.Y., assignor to Texaco Inc., New York, N.Y.
No Drawing. Continuation-in-part of application Ser. No. 708,752, Feb. 28, 1968. This application July 13, 1970, Ser. No. 54,581
Int. Cl. C07d 5/04
U.S. Cl. 260—346.1    23 Claims

ABSTRACT OF THE DISCLOSURE

A method of preparing a nitroalkyltetrahydrofuran corresponding to the formula:

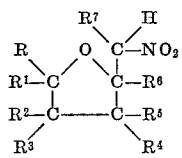

by contacting a halonitroalcohol having at least 5 carbon atoms corresponding to the formula:

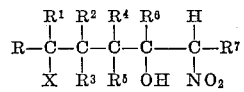

with an alkaline agent at a temperature of from about 0 to 250° C. The contemplated nitroalkyltetrahydrofurans prepared according to this invention are useful as insecticides, nematocides, coccidiostats, solvents, plasticizers, rust inhibitors, lubricant additives and fuel additives. The method of this invention also provides as valuable by-products haloketones and nitroalkanes.

---

This invention relates to a method for preparing nitroalkyltetrahydrofurans and particularly, 2 - (1-nitroalkyl)-tetrahydrofurans from halonitroalcohols. The process additionally provides as valuable by-products haloketones and nitroalkanes.

CROSS-REFERENCE TO RELATED APPLICATIONS

This application is a continuation-in-part of my co-pending application Ser. No. 708,752 filed Feb. 28, 1968 now abandoned.

BACKGROUND OF THE INVENTION

Heretofore, nitroalkyltetrahydrofurans have been prepared as by the reaction of nitromethane and an aqueous solution of 2-hydroxytetrahydrofuran in the presence of aqueous sodium hydroxide. Such procedures however produced the sought after compound in low yields. Moreover, while it was known from Wagner and Zook, Synthetic Organic Chemistry, Wiley (1953), pages 838 to 839, that 2-bromotetrahydrofuran is produced when 1,2-dibromo-4-butanol is treated with potassium hydroxide, it was believed in view of V. V. Perekalin, Unsaturated Nitro Compounds, Davy (1964), page 20 that introducing a nitro group into a haloalkanol, where the nitro group is vicinal to the hydroxy group, would result in the production of a nitroolefin since it was known that a nitro group causes the hydrogen borne on the same carbon atom to be highly acidic and would be expected to react with the adjacent hydroxy group to form water and a halonitroolefin. Alternatively, the halonitroalcohol could form dimers, oligomers and polymers (basis the teaching in Smith), The Chemistry of Open-Chain Nitrogen Compounds, vol. II, Benjamin (1966), pages 412–414, involving alkylation of a nitroalkane with a bromoalkane in the presence of an alkaline agent to produce a nitrocondensation product.

It is therefore an object of this invention to provide a novel method for the preparation of nitroalkyltetrahydrofurans.

It is another object of this invention to provide a method for the preparation of nitroalkyltetrahydrofurans and haloketones.

Yet another object of this invention is to provide a method for the preparation of nitroalkyltetrahydrofurans and haloketones which concomitantly provides a route for the production of nitroalkanes.

Other objects and advantages will become apparent from the following detailed description and examples.

SUMMARY OF THE INVENTION

Broadly, this invention contemplates a method of preparing a 2-(1-nitroalkyl)-tetrahydrofuran which comprises contacting a halonitroalcohol having at least 5 carbon atoms and corresponding to the formula:

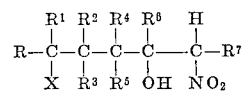

where X is a halogen selected from the group consisting of iodine, bromine and chlorine, where R is hydrogen or an alkyl group having from 1 to 95 and preferably from 1 to 20 carbon atoms and where $R^1$, $R^2$, $R^3$, $R^4$, $R^5$, $R^6$ and $R^7$ are hydrogen or alkyl groups having from 1 to 10 and preferably 1 to 6 carbon atoms with an alkaline agent and thereafter isolating and recovering the tetrahydrofuran. The contemplated nitroalkyltetrahydrofurans prepared according to the instant method correspond to the formula:

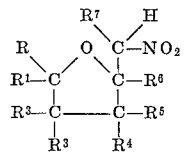

where R and $R^1$ through $R^7$ are as defined above. Moreover, when $R^6$ of the halonitroalcohol is an alkyl group the process additionally provides as valuable and substantial by-products, haloketones and nitroalkanes corresponding to the formulae:

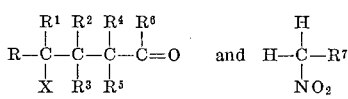

where R, $R^1$, $R^2$, $R^3$, $R^4$, $R^5$ and $R^7$ are as defined above and where $R^6$ is an alkyl group having from 1 to 10 and preferably from 1 to 6 carbon atoms which are in turn isolated and recovered.

According to this invention, the contemplated nitroalkyltetrahydrofurans are derived from halonitroalcohols corresponding to the above defined formula and include such materials as 1-nitro-2,4,4-trimethyl-5-bromo-2-pentanol,
1-nitro-2-methyl-5-bromo-2-pentanol,
1-nitro-2-methyl-5-bromo-2-hexanol,
1-nitro-2-methyl-5-iodo-2-hexanol,
1-nitro-2-methyl-5-chloro-2-hexanol,
1-nitro-2,3-dimethyl-5-chloro-2-heptanol,
1-chloro-5-nitro-4-octanol,
1-nitro-5-bromo-2-octanol,
2-nitro-3-methyl-6-bromo-3-decanol,
1-nitro-5-bromo-2-dodecanol,
2-nitro-3-ethyl-6-bromo-3-hexadecanol, 1-nitro-5-iodo-2-octadecanol,
1-nitro-5-bromo-2-octadecanol,
7-bromo-3-nitro-4-eicosanol and 2-nitro-6-bromo-3-eicosanol.

The illustrative halonitroalcohols contemplated as starting materials as listed above may be prepared for example by contacting substituted and unsubstituted olefins having at least 5 carbon atoms such as 1-pentenes, 1-hexenes, 2-hexenes, 1-octenes, 1-octadecenes, 4-nonenes, etc. with dinitrogen tetroxide and oxygen at temperatures of between —40 and 20° C. to form the nitroalkyl peroxynitrate. The intermediate nitroalkyl peroxynitrate is thereafter contacted with a reducing agent at a temperature of between —20 to 30° C. to form a vicinal nitroalkyl nitrate in accordance with the procedure described in U.S. Pat. 3,282,983. The vicinal nitroalkyl nitrate so prepared is subsequently converted to the halonitroalcohol by heating the nitrate at a temperature of at least 100° C. in the presence of a halogen donating reagent such as bromotrichloromethane in accordance with the procedures described in co-epnding application Ser. No. 694,020, filed Dec. 14, 1967, now U.S. Pat. 3,541,162 entitled "Preparation of Halonitroalcohols" by John M. Larkin and Donald R. Lachowicz and assigned to the assignee hereof.

More specifically, the process of this invention comprises contacting a halonitroalcohol as hereinabove defined with an alkaline agent thereby forming a nitroalkyltetrahydrofuran. By an alkaline agent is meant a substance capable of accepting a proton. Illustrative of the alkline gents contemplated in the instant invention are oxides, hydroxides and salts of weak acids of the metals of Groups I–A, I–B, II–A, II–B, III–A, VII–B and VIII of the Periodic Table exemplified by sodium acetate, sodium carbonate, sodium bicarbonate, sodium borate, sodium citrate, sodium propionate, sodium hydroxide, potassium hydroxide, potassium acetate, potassium stearate, lithium hydroxide, magnesium oxide, magnesium oxalate, calcium oxide, calcium carbonate, calcium octoate, strontium oxide, strontium acetate, barium oxide, barium hydroxide, barium carbonate, copper stearate, cupric oxide, zinc oxide, aluminum hydroxide, alumina hydrates, aluminum acetate, manganese acetate, manganese carbonate, cobalt acetate and cobalt hydroxide. Other alkaline agents include basic nitrogen compounds illustrated by ammonia, ammonium carbonate, amines such as triethylamine and triethanolamine, quaternary ammonium hydroxides and salts such as benzyltrimethylammonium hydroxide and its acetate. Preferably we employ weak alkaline agents, such as alumina and sodium acetate.

In accordance with the inventive process the halonitroalcohol is contacted with the alkaline agent in amounts of from about 0.1 to 5.0 equivalents of agent per mole of halonitroalcohol. While the exact mechanism by which the reaction proceeds is not fully understood, it is believed that the agent functions to remove a proton from the alcohol's hydroxyl group thereby initiating cyclic formation. Preferably reagent amounts ranging from about 0.8 to 2.0 equivalents of agent per mole of halonitroalcohol are employed.

In general the reaction is conducted under the prescribed temperature conditions outlined above and in the presence of an aqueous or non-aqueous environment. The halonitroalcohol precursor defined above has itself been found to be a satisfactory medium in those instances where it is a non-viscous liquid at the reaction temperatures prescribed above. Where the halonitroalcohol is a highly viscous liquid or a solid at the reaction temperature, aqueous or non-aqueous diluents including any non-reactive liquid hydrocarbon such as, for example, a wide range of $C_5$ to $C_{18}$ hydrocarbons including hexane, heptane, octane, nonane, dodecane, 1-octene, 1-dodecene, 2,4,4-trimethyl-1-pentene, benzene, toluene, xylene, 1,2-dichlorobenzene, perhalogenated alkanes, methanol, ethanol and isopropanol. When employing a diluent, we have found beneficial to provide the diluent in amounts ranging from about 5 to 98% diluent based on the weight of the halonitroalcohol, preferably in the range of about 40 to 90 weight percent.

Specific examples of the nitroalkyltetrahydrofurans prepared according to the inventive process include 2-(nitromethyl)-2,4,4-trimethyltetrahydrofuran,
2-(nitromethyl)-2-methyltetrahydrofuran,
2-(nitromethyl)-2,5-dimethyltetrahydrofuran,
2-(nitromethyl)-2,3-dimethyl-5-ethyltetrahydrofuran,
2-(nitromethyl)-5-propyltetrahydrofuran,
2-(1-nitrobutyl)-tetrahydrofuran,
2-(1-nitroethyl)-2-methyl-5-butyltetrahydrofuran,
2-(nitromethyl)-5-heptyltetrahydrofuran,
2-(1-nitroethyl)-2-ethyl-5-decyltetrahydrofuran,
2-(nitromethyl)-5-tridecyltetrahydrofuran,
2-(1-nitropropyl)-5-tridecyltetrahydrofuran and
2-(1-nitroethyl)-5-tetradecyltetrahydrofuran.

As previously indicated valuable reaction by-products consist of haloketones and nitroalkanes corresponding to the formulae:

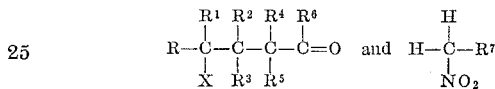

The nitroalkyltetrahydrofuran, haloketone and nitroalkane may be recovered from the reaction medium by fractional distillation at reduced pressure or by solvent extraction or by extraction of the nitroalkyltetrahydrofuran into an aqueous alkaline solution and subsequently acidifying the solution with an acid such as hydrochloric acid, sulfuric acid or phosphoric acid. The nitroalkyltetrahydrofuran can then be recovered by distillation, extraction into ether followed by evaporation of the ether or by fractional crystallization for the higher molecular weights solid nitroalkyltetrahydrofurans.

In practice, yields as high as 98 percent nitroalkyltetrahydrofuran and haloketones have been recovered and in general yields of greater than 70 percent of combined products are provided by the instant method. The ratio of haloketone to nitroalkyltetrahydrofuran prepared herein may be controlled by (1) the particular alkaline agent employed and (2) by the particular halogen provided in the halonitroalcohol. For example, when employing sodium acetate as the akaline agent the reaction products give predominantly a haloketone whereas the use of alumina converts the same halonitroalcohol to predominantly the corresponding nitroalkyltetrahydrofuran. Further, chloronitroalcohols employed in the instant invention provide predominantly haloketones whereas iodonitroalcohols give chiefly nitroalkyltetrahyrofurans. Bromonitroalcohols provide approximately equal mixtures of products. In this manner the contemplated process provides flexibility in both the type and amount of product desired.

Specific examples of the haloketones prepared according to the inventive process include 5-bromo-4,4-dimethyl-2-pentanone, 5-bromo-2-pentanone, 5-bromo-2-hexanone, 5-chloro-2-octanone, 6-iodo-3-decanone, 4,5-dimethyl-6-bromo-3-hexanone, 5-bromo-2-pentadecanone, 5-chloro-2-octadecanone, and 5-bromo-2-eicosanone. Illustrative nitroalkanes prepared include for example nitromethane, nitroethane, 1-nitropropane, 2-nitropropane, 1-nitrobutane, 2-nitrobutane; 1-nitrooctane, 4-nitrododecane and 10-nitroeicosane.

The novel nitroalkyltetrahydrofurans provided herein are useful as insecticides, nematocides, solvents, plasticizers, rust inhibitors, lubricant additives and fuel additives. Similarly the haloketones prepared according to this invention are useful as insecticides, nematocides, solvents, plasticizers and also as intermediates for the preparation of herbicides, dyestuffs and pharmaceuticals while the nitroalkanes possess utility as, for example, solvents and wetting agents.

In order to more fully illustrate the nature of our invention and manner of practicing the same the following examples are presented.

Example I

To a solution of 5.6 grams (0.05 mole) of 2,4,4-trimethyl-1-pentene in 55 milliliters of carbon tetrachloride maintained at 0° C. there was simultaneously added over a period of 4¾ hours 4.6 grams (0.05 mole) of dinitrogen tetroxide and 60.5 milliliters per minute of oxygen. The system was thereafter flushed with nitrogen and the flask contents cooled to approximately −5 to −10° C. Nitric oxide was bubbled through the solution at the rate of 60.5 milliliters per minute for 22 minutes. The resulting blue-green solution was stirred at −10° C. for an additional 15 minutes and the solvent subsequently removed under vacuum at room temperature. 10.79 grams of 1-nitro-2,4,4-trimethyl-2-pentyl nitrate was recovered.

A solution of 2.80 grams of 1-nitro-2,4,4-trimethyl-2-pentyl nitrate in 50 milliliters of bromotrichloromethane was heated at reflux (104–105° C.) for 17 hours. The halogen donor was subsequently removed under vacuum at 45° C. and 3.02 grams of a yellow liquid was recovered. By chromatography on silica gel and elution with methylene chloride and 80 percent methylene chloride-20 percent ether there was obtained 2.39 grams, corresponding to a yield of 74 percent, of product identified by infrared to be 1-nitro-2,4,4-trimethyl-5-bromo-2-pentanol.

A solution of 0.30 gram of 1-nitro-2,4,4-trimethyl-5-bromo-2-pentanol in 15 milliliters of benzene was allowed to stand at room temperature over alumina for 25 hours. The alumina was removed by filtration and 152 milligrams (71%) of a clear liquid was recovered and identified by infrared to be a mixture of 5-bromo-4,4-dimethyl-2-pentanone and 2-(nitromethyl)-2,4,4-trimethyltetrahydrofuran in the respective ratios of 2:3. The products are subsequently separated by fractional distillation at reduced pressure. Nitromethane is desorbed from the alumina by eluting with ether.

Example II

A solution of 1.05 grams of 1-nitro-2,4,4-trimethyl-5-bromo-2-pentanol and 0.75 gram of sodium acetate trihydrate in 25 milliliters of methanol was allowed to stand at room temperature for 22 hours and the solvent along with nitromethane was thereafter removed under vacuum. The residue was stirred with ether and the solids filtered off. The filtrate was evaporated and a brown liquid (0.51 gram) remained and identified as 5-bromo-4,4-dimethyl-2-pentanone and 2-(nitromethyl)-2,4,4-trimethyltetrahydrofuran in the ratio of 3:1.

The two components are separated by extracting the liquid with aqueous sodium carbonate solution. The insoluble 5-bromo-4,4-dimethyl-2-pentanone is separated by dissolving in ether and subsequently evaporating the ether. 2-(nitromethyl)-2,4,4-trimethyltetrahydrofuran is recovered by acidification of the aqueous sodium carbonate solution with dilute hydrochloric acid and then extraction into ether. The ether is evaporated off and 2-(nitromethyl)-2,4,4-trimethyltetrahydrofuran is recovered.

Example III

To a solution of 4.7 grams (0.05 mole) of 2-methyl-1-pentene in 55 milliliters of carbon tetrachloride maintained at 0° C. there was simultaneously added over a period of 4¾ hours 4.6 grams (0.05 mole) of dinitrogen tetroxide and 60.5 milliliters per minute of oxygen followed by nitric oxide reduction as in Example I. This product was indicated by infrared to be 1-nitro-2-methyl-2-pentyl nitrate. The yield was 10.27 grams.

A solution of 1.35 grams of 1-nitro-2-methyl-2-pentyl nitrate in 75 milliliters of bromotrichloromethane was heated at reflux (105.3° C.) for 31 hours. The halogen donor was removed under vacuum at 35° C. and 1.23 grams of a yellow-brown liquid identified by infrared to be 1-nitro-2-methyl-5-bromo-2-pentanol was recovered.

A solution of 0.80 gram of 1-nitro-2-methyl-5-bromo-2-pentanol in 50 milliliters of benzene was allowed to stand over 3.6 grams of alumina for 27 hours. After removal of the alumina by filtration and the solvent by evaporation 0.48 gram (98%) of a yellow liquid was recovered and identified by infrared to be 2-(nitromethyl-2-methyltetrahydrofuran and 5-bromo-2-pentanone in the ratio 4:1. The products are separated as in Example I.

Example IV

To a stirred solution of 11.2 grams (0.1 mole) of 1-octene in 55 milliliters of carbon tetrachloride maintained at 0° C. there was simultaneously introduced 9.3 grams (0.1 mole) of dinitrogen tetroxide and 60.5 milliliters per minute of oxygen over a period of 6 hours. The colorless solution was flushed with nitrogen and cooled to −10 to −20° C. and while stirring nitric oxide was bubbled in at the rate of 60.5 milliliters per minute for 38 minutes. The resulting blue-green solution was allowed to warm to room temperature and the solvent was subsequently removed under vacuum. A yellow oil weighing 21.62 grams was recovered and identified as 1-nitro-2-octyl nitrate.

A solution of 4.50 grams of 1-nitro-2-octyl nitrate in 125 milliliters of dibromodichloromethane was heated at reflux (133–135° C.) for 24 hours. The halogen donor was thereafter removed under vacuum at 60° C. leaving 6.13 grams of a brown oil. By chromatography on silica gel and elution with methylene chloride followed by 90% methylene chloride-10% ether there was obtained a dark oil which under infrared analysis was identified as containing 1-nitro-5-bromo-2-octanol.

A solution of 1.05 grams of 1-nitro-5-bromo-2-octanol prepared above was dissolved in 30–40 milliliters of benzene, and 5.0 grams of 80–200 mesh gamma alumina was added. The mixture was allowed to stand at room temperature for 48 hours. The alumina was removed by filtration and the benzene was evaporated under vacuum at 35° C. Infrared analysis of the recovered yellow liquid identified 2-(nitromethyl)-5-propyltetrahydrofuran.

Example V

A 5 percent solution of 1-nitro-2-methyl-2-hexyl nitrate in 100 milliliters of chlorobenzene is heated at 110° C. while chlorine gas is simultaneously introduced at a rate of about 100 milliliters per minute. After heating for 6–8 hours, the solvent is removed by distillation under reduced pressure and 1-nitro-2-methyl-5-chloro-2-hexanol is recovered.

A 10 percent solution of 1-nitro-2-methyl-5-chloro-2-hexanol in ethanol is stirred at 40° C. along with 1.2 equivalents of potassium carbonate per mole of halonitroalcohol. After 36 hours, the inorganic salts are removed by filtration. The ethanol diluent and some nitromethane are removed from the filtrate by distillation, and the residue comprises 5-chloro-2-hexanone, 2-(nitromethyl)-2,5-dimethyltetrahydrofuran and nitromethane which are separated by fractional distillation at reduced pressure.

Example VI

The procedures of Example V are followed except that iodine (10 grams) replaces chlorine during heating in chlorobenzene. After removal of the chlorobenzene by vacuum distillation there is obtained 1-nitro-2-methyl-5-iodo-2-hexanol. By treatment with potassium carbonate in accordance with the procedure of Example V there is obtained 5-iodo-2-hexanone, 2-(nitromethyl)-2,5-dimethyltetrahydrofuran and nitromethane.

Example VII

To 5 grams of 1-nitro-2-methyl-5-bromo-2-pentanol prepared as in Example III there is added 5 grams of barium oxide. The mixture is heated and stirred at 50° C. for 6 hours, and the inorganic components are removed by filtration. The filtrate consists of 2-(nitromethyl)-2-methyltetrahydrofuran, 5-bromo-2-pentanone and nitromethane.

Example VIII

To a solution of 0.05 mole of 3-ethyl-2-hexadecene in 100 milliliters of carbon tetrachloride maintained at 0° C. there is simultaneously added 0.05 mole of dinitrogen tetroxide in a stream of oxygen at 75 milliliters per minute during a 3 hour period. The solution is flushed with nitrogen an dis subsequently cooled to −10° C. Nitric oxide is introduced at 60 milliliters per minute for 22 minutes. The solution is stirred at −10° C. for an additional 20 minutes and thereafter allowed to warm to room temperature. The solvent is removed by evaporation under vacuum, and 2-nitro-3-ethyl-3-hexadecyl nitrate is recovered.

A 10 weight percent solution of 2-nitro-3-ethyl-3-hexadecyl nitrate in bromotrichloromethane is prepared, and heated at reflux for 28 hours. The bromotrichloromethane is removed by vacuum distillation, and 2-nitro-3-ethyl-6-bromo-3-hexadecanol is recovered.

To a 20 weight percent solution of 2-nitro-3-ethyl-6-bromo-3-hexadecanol in benzene, there is added 2 grams of alumina per gram of the halonitroalcohol. The mixture is stirred at room temperature for 36 hours, and the alumina is removed by filtration. Benzene is evaporated under vacuum and the residue comprises 6-bromo-3-hexadecanone, 2-(1-nitroethyl)-2-ethyl-5-decyltetrahydrofuran and nitroethane. Nitroethane is recovered by fractional distillation and the remaining products separated by fractional crystallization.

I claim:
1. A method of preparing a 2-(1-nitroalkyl)-tetrahydrofuran which comprises:
   (a) contacting a halonitroalcohol having at least 5 carbon atoms and corresponding to the formula:

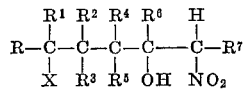

where X is a halogen selected from the group consisting of iodine, bromine and chlorine, where R is hydrogen or an alkyl group having from 1 to 20 carbon atoms and where $R^1$, $R^2$, $R^3$, $R^4$, $R^5$, $R^6$ and $R^7$ are hydrogen or alkyl groups having from 1 to 6 carbon atoms with an alkaline agent and
   (b) isolating and recovering said tetrahydrofuran.

2. A method according to claim 1 wherein from about 0.1 to 5.0 equivalents of said agent are employed per mole of said halonitroalcohol.

3. A method according to claim 1 wherein said contacting is conducted at a temperature of from about 0 to 250° C.

4. A method according to claim 1 wherein said contacting is conducted at a temperature of from about 10 to 100° C.

5. A method according to claim 1 wherein said agent is selected from the group consisting of oxides, hydroxides and salts of weak acids of the metals of Groups I-A, I-B, II-A, II-B, III-A, VII-B and VIII of the Periodic Table, and basic nitrogen compounds.

6. A method according to claim 5 wherein said agent is alumina.

7. A method according to claim 5 wherein said agent is sodium acetate.

8. A method according to claim 5 wherein said agent is potassium carbonate.

9. A method according to claim 5 wherein said agent is barium oxide.

10. A method according to claim 1 wherein said tetrahydrofuran is 2-(nitromethyl)-2,4,4-trimethyltetrahydrofuran.

11. A method according to claim 1 wherein said tetrahydrofuran is 2-(nitromethyl)-2-methyltetrahydrofuran.

12. A method according to claim 1 wherein said tetrahydrofuran is 2-(nitromethyl)-2-propyltetrahydrofuran.

13. A method according to claim 1 wherein said tetrahydrofuran is 2-(nitromethyl)-2,5-dimethyltetrahydrofuran.

14. A method according to claim 1 wherein said tetrahydrofuran is 2-(1-nitroethyl)-2-ethyl-5-decyltetrahydrofuran.

15. A method of preparing a 2-(1-nitroalkyl)-tetrahydrofuran and a haloketone, said haloketone having at least 5 carbon atoms which comprises:
   (a) contacting a halonitroalcohol having at least 5 carbon atoms and corresponding to the formula:

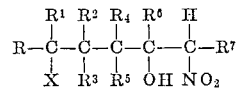

where X is a halogen selected from the group consisting of iodine, bromine and chlorine, where R is hydrogen or an alkyl group having from 1 to 20 carbon atoms, where $R^1$, $R^2$, $R^3$, $R^4$, $R^5$ and $R^7$ are hydrogen or alkyl groups having from 1 to 10 carbon atoms and where $R^6$ is an alkyl group having from 1 to 6 carbon atoms with an alkaline agent and
   (b) isolating and recovering said tetrahydrofuran and said haloketone.

16. A method according to claim 15 wherein said haloketone is 5-bromo-4,4-dimethyl-2-pentanone.

17. A method according to claim 15 wherein said haloketone is 5-bromo-2-pentanone.

18. A method according to claim 15 wherein said haloketone is 5-chloro-2-hexanone.

19. A method according to claim 15 wherein said haloketone is 5-iodo-2-hexanone.

20. A method according to claim 15 wherein said haloketone is 6-bromo-3-hexadecanone.

21. A method according to claim 15 which further comprises preparing a nitroalkane.

22. A method according to claim 21 wherein said nitroalkane is nitromethane.

23. A method according to claim 21 wherein said nitroalkane is nitroethane.

References Cited

Wagner and Zook, Synthetic Organic Chemistry, New York, N.Y., John Wiley (1953), pp. 838–39 and 656.

ALEX MAZEL, Primary Examiner

B. I. DENTZ, Assistant Examiner

U.S. Cl. X.R.
260—593, 644